(12) United States Patent
Al Ghatta et al.

(10) Patent No.: US 6,472,035 B1
(45) Date of Patent: Oct. 29, 2002

(54) STRETCHED POLYESTER FOAMED SHEETS AND CONTAINERS OBTAINED THEREFROM

(75) Inventors: Hussein Al Ghatta, Fiuggi; Sandro Cobror, Pozzilli; Tonino Severini, Colleferro, all of (IT)

(73) Assignee: Sinco Ricerche S.p.A., Verbania Pallanza (IT)

( * ) Notice: Subject to any disclaimer, the term of this patent is extended or adjusted under 35 U.S.C. 154(b) by 0 days.

(21) Appl. No.: 09/531,414

(22) Filed: Mar. 20, 2000

(30) Foreign Application Priority Data

| May 24, 1999 | (IR) | MI99A1139 |
| Nov. 15, 1999 | (EP) | 99122046 |
| Dec. 27, 1999 | (EP) | 99125951 |

(51) Int. Cl.$^7$ .................. B32B 27/08; B32B 27/34; B32B 27/36
(52) U.S. Cl. ............... 428/36.5; 428/36.6; 428/36.7; 428/435; 428/446; 428/458; 428/474.4; 428/480; 428/483
(58) Field of Search ............... 428/36.5, 36.6, 428/36.7, 347, 435, 458, 446, 474.4, 480, 483

(56) References Cited

U.S. PATENT DOCUMENTS

| 3,836,425 A | * | 9/1974 | Whiting .................. 161/165 |
| 5,000,991 A | | 3/1991 | Hayashi et al. ............ 428/36.5 |
| 6,054,500 A | * | 4/2000 | Al Ghata et al. ........... 521/138 |

FOREIGN PATENT DOCUMENTS

| EP | 0 911 150 | 4/1999 |

* cited by examiner

*Primary Examiner*—Sandra M. Nolan
(74) *Attorney, Agent, or Firm*—Guido Modiano; Albert Josif; Daniel O'Byrne

(57) ABSTRACT

Polyester resin foamed sheet, mono e biaxially stretched usable for the production of containers for beverages and foods, having a density lower than 700 kg/m$^3$ and a crystallization rate such that, when the sheet is heated at 120° C. for 5 minutes, the crystallinity does not exceeds 15%. The aromatic polyester resin used for preparing the foamed sheet can be mixed with an aliphatic polyester resin to impart biodegradability and/or compostability to the sheet or with 1–10% by weight of a polyamide.

17 Claims, No Drawings

STRETCHED POLYESTER FOAMED SHEETS AND CONTAINERS OBTAINED THEREFROM

The present invention regards stretched polyester resin foamed sheets, which are heat-sealable, and suitable for the production of beverage and food containers, on which a design can be stamped from which, by folding, the shape of the container can be developed.

BACKGROUND OF THE INVENTION

The materials employed till now for the production of beverage and food containers such as containers for fruit juices, milk or otera include substantially a fictional layer of cardboard which gives the container mechanical properties, in particular rigidity, and, adhered to the cardboard, in some cases, a layer of thin sheet of aluminum coated, on the side which comes into contact with the beverage or food, with a polyethylene film or similar polymeric material.

Containers produced with such multi-layer materials are difficult to recycle due to the different chemical nature of the various layers.

The recyclability of the material forming a food or beverage container is a most important requisite both from the point of view of savings that recycling allows to be obtained and from an ecological aspect.

The possibility of having a recyclable material is a very important topic in the sector.

Containers for beverages and liquids produced of polymeric materials exist but do not offer characteristics of rigidity comparable to those of cardboard and for this reason they do not result in being suitable to produce rigid containers. The containers obtained with such materials are comprised into the category of small sacks (pouches).

The attempt to obtain containers with the necessary rigidity by using polymeric materials has failed until now.

The rigidity in the containers is in function of the thickness of the wall and more precisely varies with the cube of the wall thickness.

The use of polymeric material such as polyolefins for the production of containers having sufficient rigidity would imply a thickness which is not economical and, furthermore, is not processable due to the difficulty in folding that one encounters in the container closing phase.

Another material such as foamed polystyrene is not employable due to its fragility when it is conformed into thin layers.

Known from the patent literature (U.S. Pat. No. 5,000, 991) are rigid laminates, which are used for the preparation of thermoformed containers for victuals, formed of a sheet of foamed polyester material and of a film of the same nature as the sheet, or of other polymeric material. Known from EB-A836937 are semi-rigid laminates having a thickness of 0,5 to 1.5 mm comprising a layer of polyester resin foam having a density of 0.7 to 1 g/cm$^3$ on which a layer having gas barrier properties, made of a polymeric material different from that of the layer in polyester foam, is adhered.

The laminates are used for the preparation by thermoformation of articles for packaging.

Materials comprising a layer in polyester foam capable of being creased to form, by folding according to the design pressed on the material, the shape of the container, are not known in patent literature.

The capability of a monoslayer or multi-layer polymeric foamed material, to be creased with a design set to develop, by folding, the shape of a coner, and the foldability of the material according to such a design, constitute indispensable requirements for the production of beverage and food containers when using the creasing and folding technique.

A material is suitable for creasing if the design pressed on it remains stable over time and if when stamping such design, breakage which could impair the possibility of folding the material does not occur.

Moreover the material must be heat-sealable so as to make possible the closure of the container.

BRIEF DESCRIPTION OF THE INVENTION

Aromatic polyester resin foamed sheets have now unexpectedly been found, which are suitable for the production of beverage and food containers, satisfying the above mentioned creasing requirements, and which present rigidity sufficient to substitute cardboard and have high impact resistance.

The sheets of the present invention are monoaxially or biaxially stretched foamed sheets, have a crysallization rate of the resin such that by heating at 120° C. for 5 minutes the crystalinity does not exceed 15% and have pressed thereon a design from which by folding a container can be developed.

DETAILED DESCRIPTION OF THE INVENTION

The polyester resin preferably used for the preparation of the stretched foamed sheets is a copolyethylene terephthalate in which from 2 to 20% in moles of units of terephthalic acid are substituted by units deriving from isophtalic and/or naphtalene-dicarboxylic acids.

Preferably, the copolyethylene terephtalate comprises from 4 to 10% of units deriving from isophtalic acid.

The intrinsic viscosity of the resin is higher than 0.8 dl/g (measured in solution 60/40 by weight of phenol and tetrachloroethone at 25° C. according to ASTM D 4603-86).

The melt strength is higher than 2 centi Newton at 280° C. preferably is from 10 to 100 centi Newton and the melt viscosity is of at least 1200 PAS at 280° C. and shear rate tending to zero, preferably 2000–20.000 PAS.

Preferably the resin is obtained by upgrading the resin having I.V. of less than about 0.7–0.75 dl/g at a temperature from 160° C. to 210° C. operating in the presence of a dianhydride of an aromatic tetracarboxylic acid, preferably pyromellitic dianhydride used in an amount of from 0.04 to 2% by weight. The preparation of the foamed sheets is carried out according to known methods. which is herewith incorporated by reference.

The melt strength and the melt viscosity are measured according to the methods hereinafter specified.

The melt strength of the resin forming the sheet shows values lower than those of the resin used for preparing the sheet.

The stretched foamed sheets of the present invention are obtained by stretching according to known methods foamed sheets having bulk density from 50 to 700 kg/m$^3$, preferably 200 to 400 kg/m$^3$, thickness from 0.5 to 5.

The thickness of the stretched sheets is reduced in function of the stretching ratio applied and is generally comprised from 0.2 to 3 mm, preferably from 0.6 e 1.2 mm.

The density of ie biaxially oriented sheets in general is higher than tat of the sheets prior to strething.

When the used foaming agent is a liquid hydrocarbon the density decreases.

The monoaxially stretched sheets have a density lower tan that prior to stretching (the lower density is due to the different apparatus used for the monoaxially stretching which is different from that used in the biaxially stretching).

Stretching ratio of 1.2:1 is sufficient in the case of the monoxially stretched sheets to impart the desired mechanical properties, in particular the increased impact resistance.

The high impact properties combined with the low density renders the monoaxially stretched sheets particularly suitable for the manufacture of containers for beverages and food.

The biaxially stretching (in direction of the machine and transversally) can be carried out contemporaneously or sequentially.

The stretching temperate is generally comprised from 80° C. to 120° C.

The residence time is of few seconds to 60 or more seconds.

The monoxially stretching can be conducted on a series of rolls heated at 95° C.–110° C. and rotating with different peripheral speed.

The monoaxially stretching can be conducted in the direction of the machine or transversally.

In many cases it is convenient to subject the stretched sheets to heat setting at temperatures in general comprised from 160° C. to 220° C.

The heat setting has the effect of dimensionally stabilizing the sheets (the shrinkage is remarkably reduced) and increasing the mechanical properties.

With the aim of improving the gas barrier properties of the foamed sheet, the same can be coated with a polyester resin film or other material having gas barrier properties.

In the case in which the sheet is covered with a polyester film, the barrier properties of the latter are conferred by subjecting the film to surface treatment giving it barrier properties or by the application of materials with barrier properties such as aluminum and oxides of aluminum and silicon ($Al_2O_3$ and $SiO_x$).

A representative surface treatment is the lacquering of the film with a layer of lithium or potassium polysilicate. The treatment allows the realization of very slow oxygen permeation rates, which can be 0.3 ml/m$^2$/24h/atm or less.

The application of layers of aluminum and oxides of Al and/or Si is carried out according to known methods.

The surface treatments and the deposition of barrier materials are selected and carried out in a way such as to confer to the polyester film oxygen permeability properties generally lower than 70 ml/m$^2$/24h/atm (ASTM 1434). In the case of a film metallized with Al or coated with oxides of Al and/or Si, the rate of oxygen permeability can be reduced to values lower than 0.3 ml/m$^2$/24h/atm. Values lower than 10 ml/m$^2$/24h/atm are preferred.

Polyester films metallized with aluminum are commercially obtainable under the name of Nu Roll of Nurol S.p.A. (Nu Roll is a registered trade mark of Nurol S.p.A.).

In the case where a film with barrier properties is adhered on the sheet, the untreated side of this film is the one which comes into contact with the beverage or food inside the container.

It is also possible, and this is in function of the various requirements, such as for example printing with inks or other, to use a film corresponding to the above requirements as external layer having the foamed sheet onto which the film is adhered as the internal layer.

The adhesion of the film with barrier properties or other film on the foamed sheet, can be realized according to known methods by gluing or heat-lamination or by coextrusion.

It is also possible to cover the foamed polyester sheet with a layer of a heat-sealable polymer different from the polyester resin.

The rigidity of the stretched foam sheets is in function of the thickness of the same: it increases (not proportionally) with the thickness. The use of inorganic fillers (usable up to about 20% by weight) allows an increase of the sheet rigidity. Examples of fillers are silica, alumina, titanium dioxide, calcium carbonate and similar.

The production of the container realized according to known methods by folding in accordance wit a design pressed on the sheet by creasine, set to develop the shape of the container.

The containers can have a different shape and volume according to their end use. Cubic, oblong or pyramid shapes can be used. Generally the volume of the containers for beverages and fruit juices is between 0.2 and 2 litres.

The surface characteristics of the stretched foamed sheets renders the same suitable for being easily inkable.

The high impact resistance of the stretched sheets renders the containers suitable to be used under conditions wherein the impact resistance is a required property.

The polyester resin used for the preparation of stretched foamed sheets of the invention and having the characteristics herein above set forth is obtainable by polycondensation of an aromatic bicarboxylic acid, preferably terephthalic acid, with a diol of 2–12 carbon atoms such as ethylene glycol, 1,4-buthane-diol, or by transesterification of a dimethylester of the aromatic bicarboxylic acid with a diol and polycondensation of the hydroxi ester.

Preferably the resin is selected from the polyethylene terephthalate copolymers in which up to 20% by moles of unit deriving from terephthalic acid are substituted by units deriving from isophthalic acid and/or a naphthalene-dicarboxylic acid.

To impart biodegradability and/or compostability to the foamed sheets, the polyester resin used to prepare the sheets is mixed with 10–35% by weight of a biodegradable aliphatic polyester resin, and the mixture is subjected to a reaction of polyaddition in the solid state in the presence of a dianhydride of a tetracarboxylic acid, preferably aromatic.

Pyromellitic anhydride is the preferred dianhydride and is employed in a quantity from 0.05% to 2% by weight of the total quantity of resin.

The reaction of polyaddition in the solid state is carried out at a temperature from about 150 to 220° C., for periods of time and with dianhydride concentration sufficient to obtain resin intrinsic viscosity values higher than 0.7 dl/g (viscosity measured at 25° C. in a mixture 60/40 by weight of phenol and tetrachloroethane) and values of melt strength sufficiently high to allow foaming of the resin.

The intrinsic viscosity is generally comprised between 0.8 and 1.2 dl/g.

Suitable melt strength values are higher than 8 centinewton, and preferably higher than 20 centinewton.

The aliphatic polyester resin is obtained by polycondensation of a hydroxy-acid with 2–22 atoms of carbon or its lactone or lactide, or by polycondensation of an aliphatic bicarboxylic acid with 2–22 carbon atoms with an aliphatic or aromatic diol with 2–22 carbon atoms. Polycaprolactone is the preferred polyester. The above polyesters have the characteristic of being biodegradable.

EXAMPLES

Measurement Methods

The rheological measurements are made according to ASTM D 3835 using a Goeffert rheometer at 280° C.

The melt strength is determined measuring the force in cN necessary to stretch the material extruded from the capillary of Goeffert Rheometer 2002.

For the determination, a Rheotens apparatus is applied to the exit of a capillary of Goeffert Rheometer 2002.

The extrusion conditions are as follows:

| speed of the pistons | 0.2 mm/sec |
|---|---|
| die diameter | 2 mm |
| length of the capillary | 30 mm |
| temperature of test | 280° C. |
| acceleration used | 2.4 cm/sec2 |

Every test is repeated twice and the average of the two results is the reported value.

The crystallinity is measured according to the ATR method (Alternated Total Reflectance) from the ratio between the trans and gauche configuration. The ATR instrument was fitted to a Perkin model 2000 FT-IR. Absorption at 1410 $cm^{-1}$ was used as reference band.

The following examples are provided to illustrate but not to limit the invention.

Example 1

A monoaxially stretched (stretch ratio of 1.1:1) sheet of foamed COPET (copolyethylene terephthalate containing 4% by weight of isophthalic acid) having a crystallization rate such that when heated at 120° C. for 5 minutes the cristallinity does not exceed 15%, a thickness of 0.7 mm and a density of 375 Kg/$m^3$ is creased with a design suitable to develop after folding a container having a parallelepipedon shape.

The stretched sheet was obtained from a foamed sheet having density of 450 Kg/$m^3$, thickness of 1.1 mm and average diameter of the cells of 300 micron and cristallinity content of 8%.

The total impact energy determined using a Franctovis Ceast impact lo apparatus was of 0.41 J; the energy after stretching (stretching ratio 1.2:1) was 0.59J.

The foamed sheets were obtained from COPET having melt strength of 150 cN at 280° C., melt viscosity of 1800 PAS at 300° C. and 10 rad/second and intrinsic viscosity of 1.24 dl/g, prepared by upgrading the COPET with LV of 0.7 dl/g at 210° C. in presence of 0.4% by weight of pyromellic dianhydride.

The container is closed by heat-sealing. The closure is hermetically sealed, and is easily openable by tearing, or by cutting or by other methods.

Example 2

A monoaxially foamed sheet with the characteristics reported in Example 1, is adhered with the use of a glue compatible with recyclability of the container, to a Nu Roll metallized film of Nurol S.p.A. with a thickness of 15 micron.

The sheet is utilized for the production of containers for liquids.

Example 3

A biaxally stitched foamed sheet (stretching ratio of 3:1 in both directions) obtained from a foamed sheet prepared from copolyethylene terephralate containing 4% of units of isophidlic acid, mixed with 10% by weight of polycaprolatone UC PCL 787 from Union Carbide, and then subjected to polyaddition in the solid state at 180° C. until inherent viscosity of 0.85 dl/g is obtained, having a thickness of 1.2 mm, a density of 180 kg/$m^3$ and crystallization rate of the resin such that, when heated at 120° C. for 5 minutes, the crystallinity does not reach values higher than 15%, is pressed according to a design intended to develop, by folding, a container of parallelepipedon shape, The creased sheet is used for the preparation of containers for medium shelf-life milk and for fruit juices.

The containers are closed by heat-sealing. The closure is maintained hermetical and is easily openable by tearing, by cutting or by other methods.

The containers subjected to composting under normal operational conditions used in composting processes, result compostable.

Example 4

A foamed PET sheet having the characteristics of Example 3, is adhered by gluing with glue which is compatible with the recyclability of the container, to a Nu Roll metallized film of thickness 15 micron of Nurol S.p.A.

The sheet is utilized for the production of containers for liquids, having barrier properties.

The disclosures in Italian Patent Application No. MI99A001139, in E.P.A. No. 99122046.8 and in E.P.A. No. 99125951.6 from which this application claims priority are incorporated herein by reference.

What is claimed is:

1. A mono- or biaxially-stretched foamed sheet made from an aromatic polyester resin selected from the group consisting of copolyethylene terephthalates containing from 2 to 20 moles % of isophthalic acid and/or naphthalene dicarboxylic acids, suitable for the production of beverages and food containers, having a density lower than kg/$m^3$ and having creased on it a patter which by folding along creased lines will develop the shape of a container, wherein the crystallization rate of he resin is such that, by heating at 120° C. for 5 minutes, the crystallization does not exceed 15%, said sheet being stretched with a ratio of from 1:1 to 5:1.

2. The sheet according to any one of claims 1 to 3 in which the polyester resin has melt it strength higher tan 1 cN and melt viscosity higher than 1500 Pa·s with shear rate tending to zero when measured at 280° C.

3. The sheet according to claim 1, in which the polyester resin is mixed with 1 to 10% by weight of a polyamide.

4. The sheet according to claim 1, in which a polyester film is adhered, said polyester film having an oxygen permeability rate lower tan 70 ml/$m^2$/24h/atm.

5. The s according to claim 4, in which the polyester film is metallized with aluminum or coated with a layer of alumna or silicon oxide, or with potassium or lithium polysilicates.

6. The sheet according to claim 1, in which a with gas barrier properties is rendered adherent to the stretched foamed sheet by the use of glues or by heat lamination.

7. The sheet according to claim 1, in which the foamed sheet has a density of from 60 and 500 kg/$m^3$.

8. The sheet according to claim 7, in which the foamed sheet has a density from 100 and 400 kg/$m^3$.

9. The sheet according to claim 1, having a thickness from 0.5 to 3 mm.

10. The sheet according to claim 9, having a thickness of 0.7 to 1.5 mm.

11. The sheet according to claim 1, including an inorganic filler.

12. The sheet according to claim 1, obtained from an aromatic polyester resin mixed with 10–30% by weight of an aliphatic polyester resin.

13. The sheet according to claim 1, which is monoaxially stretched.

14. A beverage or food container, manufactured from the sheet of claim 1.

15. The container according to claim 14, having a closure which is made by heat-sealing.

16. A container for fruit juices or for sterilized milk, manufactured by using a sheet of claim 1, to which a film is made to adhere having oxygen barrier properties corresponding to a permeation rate lower than 70 ml/m$^2$/24h/atm.

17. The container according to claim 16, in which the film adhered to the sheet presents an oxygen permeability rate lower than 10 ml/m$^2$/24h/atm.

\* \* \* \* \*